United States Patent
Horiuchi et al.

(10) Patent No.: US 9,121,987 B2
(45) Date of Patent: Sep. 1, 2015

(54) DISPLAY DEVICE USING COHERENT LIGHT BEAM AND VEHICLE BASED THEREON

(75) Inventors: Kazuo Horiuchi, Kanagawa-ken (JP); Naotada Okada, Kanagawa-ken (JP); Haruhiko Okumura, Kanagawa-ken (JP); Takashi Sasaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1039 days.

(21) Appl. No.: 12/323,818

(22) Filed: Nov. 26, 2008

(65) Prior Publication Data

US 2009/0135374 A1 May 28, 2009

(30) Foreign Application Priority Data

Nov. 26, 2007 (JP) ................................. 2007-304030

(51) Int. Cl.
*G02B 27/10* (2006.01)
*G02B 3/00* (2006.01)
*H04N 9/31* (2006.01)
*G02B 27/14* (2006.01)
*G02B 27/18* (2006.01)
*G02B 27/48* (2006.01)
*G02B 26/10* (2006.01)

(52) U.S. Cl.
CPC ............ *G02B 3/0062* (2013.01); *G02B 27/104* (2013.01); *G02B 27/145* (2013.01); *G02B 27/18* (2013.01); *G02B 27/48* (2013.01); *H04N 9/3129* (2013.01); *H04N 9/3135* (2013.01); *G02B 26/10* (2013.01)

(58) Field of Classification Search
CPC ...... G02B 27/104; G02B 27/48; G02B 26/10; G02B 27/18; G02B 27/145; H04N 9/3129; H04N 9/3132; H04N 9/3135
USPC ............................... 353/38, 94, 122; 359/630
See application file for complete search history.

(56) References Cited

U.S. PATENT DOCUMENTS

| | | | | |
|---|---|---|---|---|
| 4,619,508 | A * | 10/1986 | Shibuya et al. | 353/122 |
| 4,769,750 | A * | 9/1988 | Matsumoto et al. | 362/268 |
| 7,199,933 | B2 * | 4/2007 | Yavid et al. | 359/626 |
| 7,244,028 | B2 * | 7/2007 | Govorkov et al. | 353/37 |
| 2002/0196414 | A1 * | 12/2002 | Manni et al. | 353/31 |
| 2003/0039036 | A1 * | 2/2003 | Kruschwitz et al. | 359/707 |
| 2005/0083572 | A1 * | 4/2005 | Shimizu | 359/460 |
| 2005/0140929 | A1 * | 6/2005 | Nambudiri et al. | 353/31 |
| 2006/0126022 | A1 * | 6/2006 | Govorkov et al. | 353/31 |
| 2006/0262409 | A1 * | 11/2006 | Yavid et al. | 359/619 |
| 2007/0273843 | A1 * | 11/2007 | Stern et al. | 353/98 |

FOREIGN PATENT DOCUMENTS

| | | |
|---|---|---|
| JP | 2-195388 | 8/1990 |
| JP | 3-103817 | 4/1991 |
| JP | 8-169260 | 7/1996 |
| JP | 2000-47138 | 2/2000 |
| JP | 2003-29197 | 1/2003 |
| JP | 2003-516565 | 5/2003 |
| JP | 2005-316270 | 11/2005 |

OTHER PUBLICATIONS

Japanese Office Action issued Feburary 8, 2012 in patent application No. 2007-304030 with English translation.

* cited by examiner

*Primary Examiner* — Bao-Luan Le
(74) *Attorney, Agent, or Firm* — Oblon, McClelland, Maier & Neustadt, L.L.P.

(57) ABSTRACT

A display device includes: a light source configured to generate a coherent light beam; and an optical plate including a plurality of microlenses arranged with a period larger than the diameter of the light beam, the optical plate being configured to control the divergence angle of the light beam.

19 Claims, 11 Drawing Sheets

DISPLAY DEVICE USING COHERENT LIGHT BEAM AND VEHICLE BASED THEREON

CROSS-REFERENCE TO RELATED APPLICATIONS

This application is based upon and claims the benefit of priority from the prior Japanese Patent Application No. 2007-304030, filed on Nov. 26, 2007; the entire contents of which are incorporated herein by reference.

BACKGROUND OF THE INVENTION

1. Field of the Invention

This invention relates to a display device and a vehicle based thereon.

2. Background Art

To increase display brightness is important in improving display visibility. However, simply increasing display brightness incurs increased power consumption and hence may be impractical. Thus, it is investigated to improve brightness by limiting the display area, or the spatial region of visible display. For example, in a known display device using a high-brightness light source with low power consumption, such as a laser, the visible spatial region is limited by interposing a microlens array sheet, for example, between the laser light source and the viewer and suitably designing the optical characteristics of this microlens to control the divergence angle of laser light, control the visible spatial region, and improve display brightness without adversely affecting the power consumption. However, irradiation of a microlens array sheet with coherent light such as laser light causes speckles to be visible, and is impractical.

On the other hand, for example, head-up display (HUD) displays various traffic information through the windshield of a car on the external background field. For such a head-up display, JP-A 2-195388 (Kokai) (1990) proposes a technique to reduce speckles by vibrating a diffusion plate interposed in the optical path of laser light. However, this method involves a complicated structure because the diffusion plate is vibrated, and was unsuccessful in completely removing speckles. Furthermore, because the diffusion plate cannot control the divergence angle of laser light, this method of using the diffusion plate is not applicable to improving HUD visibility by controlling the spatial region of visible display for traffic information within a certain extent (for example, controlling it so that the display is visible to only one eye).

SUMMARY OF THE INVENTION

According to an aspect of the invention, there is provided a display device including: a light source configured to generate a coherent light beam; and an optical plate including a plurality of microlenses arranged with a period larger than the diameter of the light beam, the optical plate being configured to control the divergence angle of the light beam.

According to another aspect of the invention, there is provided A vehicle including: a display device including a light source configured to generate a coherent light beam and an optical plate including a plurality of microlenses arranged with a period larger than the diameter of the light beam, the optical plate being configured to control the divergence angle of the light beam; and a projection plate on which the light beam emitted from the display device is projected.

DETAILED DESCRIPTION OF THE INVENTION

Embodiments of the invention will now be described in detail with reference to the drawings.

First Embodiment

Figure 1A:
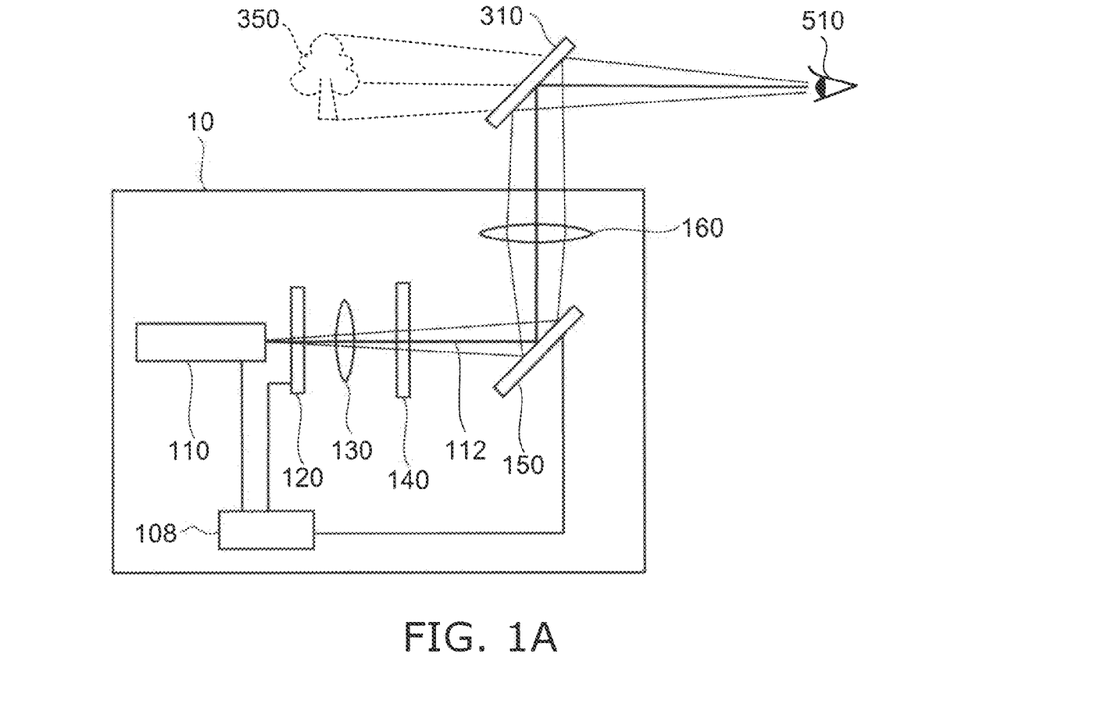
FIGS. 1A and 1B are schematic views illustrating the configuration of a display device according to a first embodiment of the invention.
Figure 1B:
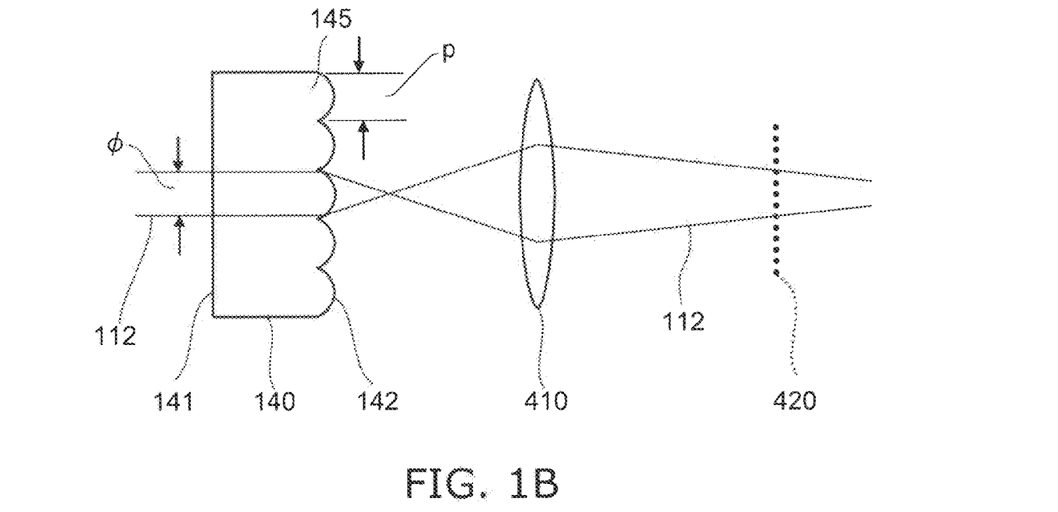

FIG. 1 schematically illustrates the configuration of a display device according to a first embodiment of the invention.

FIG. 1A is a schematic view illustrating the configuration of the display device according to the first embodiment of the invention.

As shown in FIG. 1A, the display device 10 of the first embodiment of the invention includes a light source 110 for generating a coherent light beam 112. The light source 110 can be based on any of various solid-state lasers and gas lasers, as well as semiconductor lasers and laser diodes (LD).

The laser light (light beam 112) generated by the light source 110 is coherent. The light beam 112 is emitted from the light source 110, and then passes through a first mirror 120, a projection lens 130, and an optical plate 140, travels to a second mirror (projection direction controller) 150 and a magnifying optical system 160, and is emitted with a prescribed divergence angle.

Then, the light beam 112 having the prescribed divergence angle is emitted from the display device 10 and projected on a projection plate 310, and reaches a viewer 510. The projection plate 310 can be made of a mirror or a translucent plate, which can be illustratively configured as a transparent body having a surface partly reflecting light. The viewer 510 can view a virtual image 350 formed behind the projection plate 310.

The light source 110 can include an optical system (not shown) for concentrating the light beam 112.

FIG. 1B is a partial schematic view illustrating the configuration of the display device according to the first embodiment of the invention.

As illustrated in FIG. 1B, in the optical plate 140, for example, the first major surface 141 for receiving the light beam 112 is planar, and the opposite surface, or the second major surface 142, is illustratively provided with microlenses 145. A plurality of microlenses 145 are regularly arrayed with a spacing of pitch p. The optical characteristics of this microlens 145 allow the divergence angle of the incident light beam 112 to be controlled within a prescribed range. As illustrated in FIG. 1B, the optical plate 140 can be formed into a fly-eye structure in which microlenses are regularly arranged in a two-dimensional manner.

As described later, the optical plate 140 can be based on any of various configurations, such as a structure in which lenticular plates with a plurality of microlenses (cylindrical lenses) arrayed therein are placed so that the microlenses have generally orthogonal extending directions and are opposed to each other.

As shown in FIG. 1B, in the display device 10, the pitch p of the microlens 145 of the optical plate 140 is designed to be substantially larger than the diameter φ of the light beam 112. After being emitted from such an optical plate 140, the light beam 112 passes through various optical elements and reaches the viewer. The right-side portion of FIG. 1B schematically shows the viewer's eye, where the light beam 112 passes through the lens 410 of the viewer's eye and reaches the viewer's retina 420. As shown in FIG. 1B, because the diameter φ of the light beam 112 is smaller than the pitch p of the microlens 145, the light beam 112 fits into the range of a single microlens 145 and causes no interference on the retina 420, substantially avoiding speckles.

Thus, the display device 10 illustrated in FIG. 1 is free from the occurrence of speckles and can realize a highly uniform display with a controlled divergence angle.

First Comparative Example

In the following, a display device of a first comparative example is described.

Figure 2:
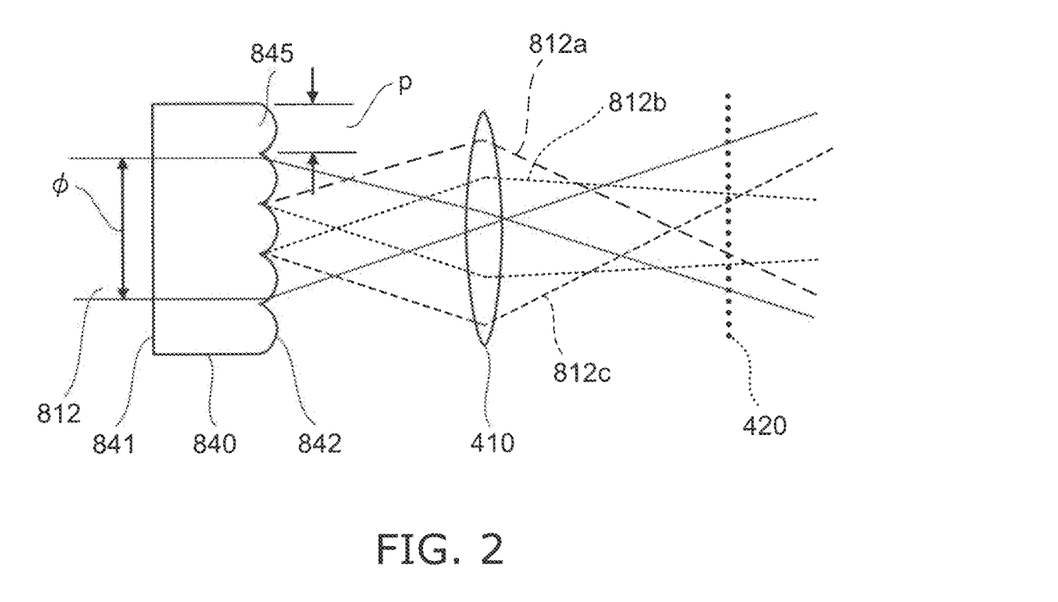
FIG. 2 is a schematic view illustrating the configuration of a display device of a first comparative example.

FIG. 2 is a schematic view illustrating the configuration of the display device of the first comparative example.

As shown in FIG. 2, in the display device of the first comparative example, the diameter φ of the light beam 812 is larger than the pitch p of the microlens 845 of the optical plate 840. In the example of FIG. 2, the diameter φ of the light beam 812 is approximately three times the pitch p. As shown in FIG. 2, after being emitted from the optical plate 840, the light beam 812 is split into three light beams 812a, 812b, and 812c, which pass through the lens 410 of the viewer's eye and reaches the viewer's retina 420. Here, because the three light beams 812a, 812b, and 812c are coherent, they interfere with each other and appear as speckles. Thus, if the diameter φ of the light beam 812 is larger than the pitch p of the microlens 845, the microlens 845 produces a plurality of light beams, producing speckles.

In contrast, in the display device 10 of this embodiment, the diameter φ of the light beam 112 is designed to be smaller than the pitch of the microlens 145. Hence, a display device substantially free from speckles can be realized with high display uniformity and a controlled divergence angle. Thus, a bright display can be realized with a limited spatial region of visible display, and a highly visible HUD can be realized with a controlled spatial region of visible display (for example, controlled so that the display is visible to only one eye).

In the following, experimental results for the embodiment of the invention and the comparative example are described in detail.

Figure 3:
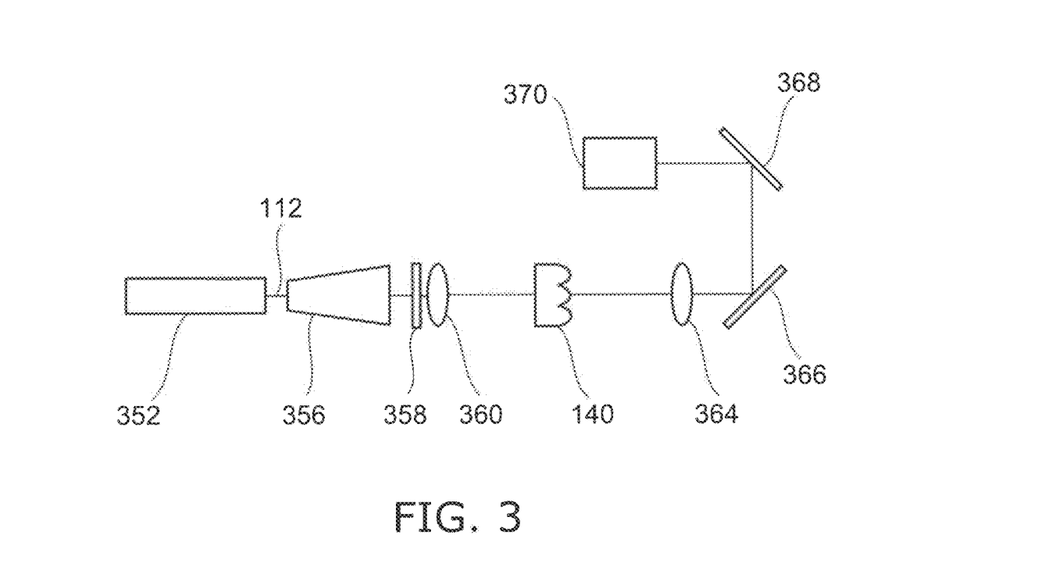
FIG. 3 is a schematic view showing the optical system used in the experiment for the display device according to the embodiment of the invention and the display device of the comparative example.

FIG. 3 is a schematic view showing the optical system used in the experiment for the display device according to the embodiment of the invention and the display device of the comparative example.

As shown in FIG. 3, in the optical system used in the experiment, a light beam (laser beam) 112 emitted from a He—Ne laser light source 352 travels to a beam magnifying optical system 356, an ND filter 358, a first lens 360, an optical plate 140, a second lens 364, a third mirror 366, and a fourth mirror 368, and reaches a CCD (charge coupled device) element 370. The distance from the emission position of the He—Ne laser light source 352 to the first lens 360 was 210 mm, the distance from the first lens 360 to the optical plate 140 was 245 mm, and the distance from the optical plate 140 to the second lens 364 was 250 mm. The distance from the second lens 364 to the CCD element 370 was varied in the range of ±25 mm around 330 mm, the imaging distance. Furthermore, the focal distance of the first lens 360 and the second lens 364 was 100 mm and 150 mm, respectively. The optical plate 140 was a lenticular plate in which microlenses (cylindrical lenses) having a focal distance of 100 mm are arranged with a pitch p of 1.5 mm. The diameter φ of the light beam 112 was adjusted to 1.0 mm, which is smaller than the microlens pitch p, or to 4.5 mm, which is larger than the microlens pitch p. This adjustment of the diameter φ of the light beam 112 was performed by the beam magnifying optical system 356.

Figure 4A:
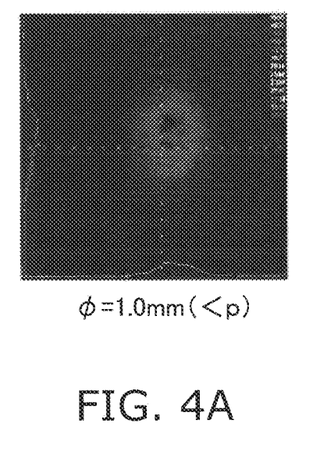
FIGS. 4A and 4B are photographs illustrating the experimental results for the display device according to the embodiment of the invention and the display device of the comparative example.
Figure 4B:
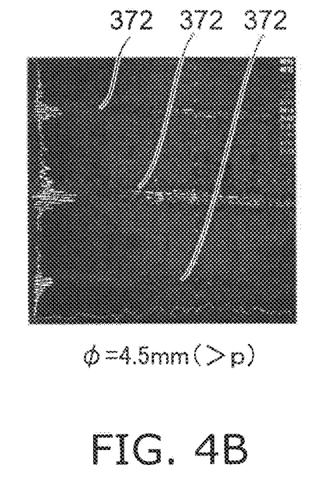

FIG. 4 shows photographs illustrating the experimental results for the display device according to the embodiment of the invention and the display device of the comparative example.

FIGS. 4A and 4B illustrate, respectively, the cases where the diameter φ of the light beam 112 is 1.0 mm, which is smaller than the microlens pitch p, and is 4.5 mm, which is larger than the microlens pitch p. These figures illustrate the results in which the distance from the second lens 364 to the CCD element 370 is 305 mm. That is, in these illustrated cases, the distance from the second lens 364 to the CCD element 370 is 25 mm shorter than the imaging distance, 330 mm.

As shown in FIG. 4B, in the case where the diameter φ of the light beam 112 is 4.5 mm, which is larger than the pitch p, a horizontal fringe pattern 372 is seen. This fringe pattern 372 indicates interference of the laser light beams, that is, occurrence of speckles.

In contrast, as shown in FIG. 4A, in the case where the diameter φ of the light beam 112 is 1.0 mm, which is smaller than the pitch p, no fringe pattern is seen. That is, no interference occurs between the laser light beams, and speckles can be avoided.

In the following, simulation results for this phenomenon are described.

Figure 5A:
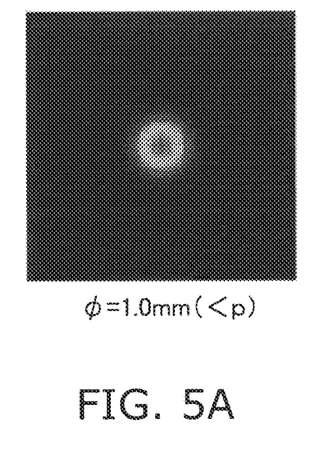
FIGS. 5A and 5B are schematic views illustrating simulation results for the display device according to the embodiment of the invention and the display device of the comparative example.
Figure 5B:
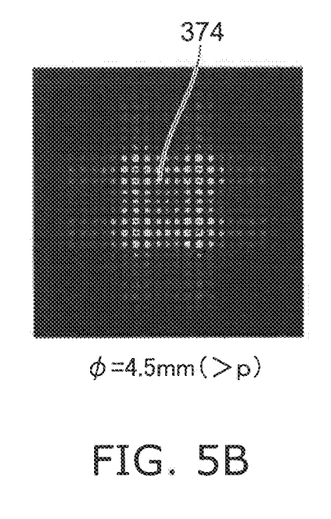

FIG. 5 schematically illustrates simulation results for the display device according to the embodiment of the invention and the display device of the comparative example.

In the experiment, the results of which are illustrated in FIGS. 4A and 4B, the optical plate 140 has a lens configuration in which a plurality of microlenses are arrayed in one dimension. However, in the simulation illustrated in FIGS. 5A and 5B, the optical plate 140 is a fly-eye lens in which microlenses are arrayed in two dimensions. The pitch p of this fly-eye lens was 1.5 mm, like the experiment in FIGS. 4A and 4B.

As shown in FIG. 5A, in the case where the diameter φ of the light beam 112 is 4.5 mm, which is larger than the pitch p, many bright spots 374 are observed. This bright spot 374 corresponds to interference of the laser light beams. That is, in the case where the diameter φ of the light beam 112 is 4.5 mm, which is larger than the pitch p, speckles are produced.

In contrast, as shown in FIG. 5A, in the case where the diameter φ of the light beam 112 is 1.0 mm, which is smaller than the pitch p, bright spots 374 substantially disappear. That is, in the case where the diameter φ of the light beam 112 is 1.0 mm, which is smaller than the pitch p, no interference occurs between the laser light beams, and no speckle is produced.

Thus, the simulation also confirms that speckles can be avoided by designing the diameter φ of the light beam 112 to be smaller than the pitch p.

In the imaging results of laser light by the CCD element 370 illustrated in FIGS. 4A and 4B, no fringe pattern occurred in the case where the distance from the second lens 364 to the CCD element 370 is not less than the imaging distance, 330 mm, irrespective of whether the diameter φ of the light beam 112 is larger or smaller than the pitch p. That is, in the case where the distance from the second lens 364 to the CCD element 370 is shorter than the imaging distance, 330 mm, a plurality of light beams split by the optical plate 140 interfere with each other at the imaging surface of the CCD element 370 and produce a fringe pattern.

Next, the results of a visual observation experiment for the display device according to the embodiment of the invention are described.

Figure 6:
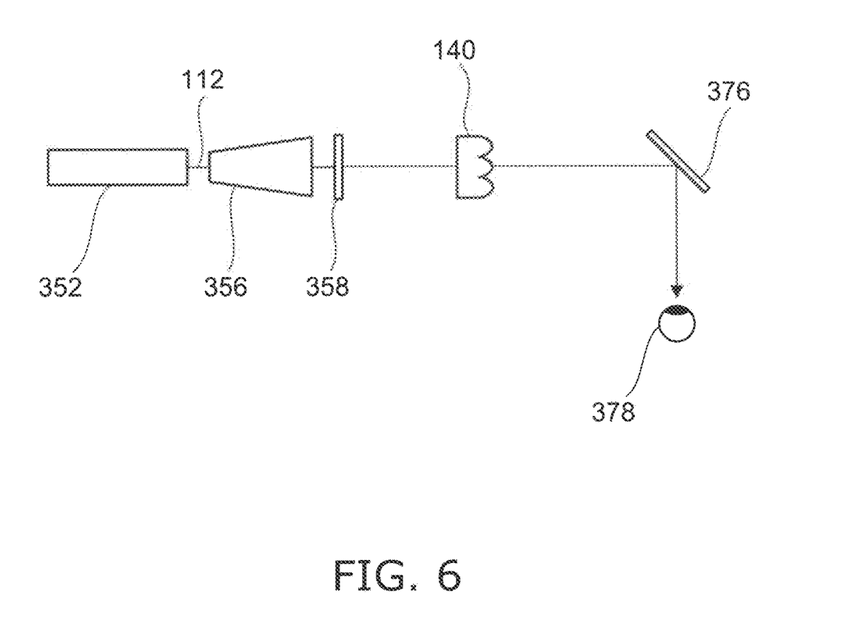
FIG. 6 is a schematic view showing the optical system used in the visual observation experiment for the display device according to the embodiment of the invention and the display device of the comparative example.

FIG. 6 is a schematic view showing the optical system used in the visual observation experiment for the display device according to the embodiment of the invention and the display device of the comparative example.

As shown in FIG. 6, in the experiment of visually observing a display on the display device, a light beam (laser beam) 112 emitted from a He—Ne laser light source 352 travels to a beam magnifying optical system 356, an ND filter 358, an optical plate 140, and a fifth mirror 376, and reaches the viewer's eye 378. The distance from the emission position of the He—Ne laser light source 352 to the ND filter 358 was 210 mm, the distance from the ND filter to the optical plate 140 was 245 mm, and the distance from the optical plate 140 to the viewer's eye 378 was 2000 mm. The optical plate 140 was a lenticular plate in which semi-cylindrical lenses having a focal distance of 100 mm are arranged with a pitch p of 1.5 mm, like the optical plate 140 illustrated in FIG. 3. The diameter φ of the light beam 112 was adjusted to 1.0 mm, which is smaller than the pitch of the microlens (cylindrical lens), or to 4.5 mm, which is larger than the pitch of the microlens. This adjustment of the diameter φ of the light beam 112 was performed by the beam magnifying optical system 356.

In the optical system shown in FIG. 6, in the case where the diameter φ of the light beam 112 is 1.0 mm, which is smaller than the microlens pitch, no speckle was observed at any times when the eye was focused on the optical plate 140 and on a nearer and farther position. On the other hand, in the case where the diameter φ of the light beam 112 is 4.5 mm, which is larger than the microlens pitch, no speckle was observed when the eye was focused on a position nearer than the optical plate 140 and on the optical plate 140, but speckles were observed when the eye was focused on a position farther than the optical plate 140.

In the following, this phenomenon is described in detail.

FIG. 7 schematically illustrates the state of the eye in viewing the display device according to the embodiment of the invention and the display device of the comparative example.

Figure 7A:
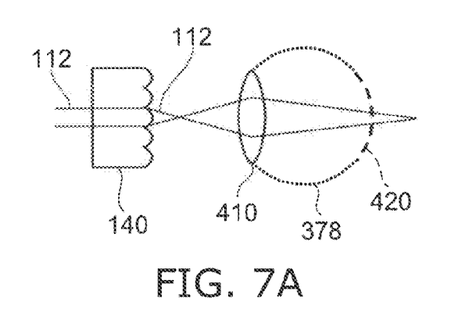
FIGS. 7A to 7F are schematic views describing the state of the eye in viewing the display device according to the embodiment of the invention and the display device of the comparative example.
Figure 7B:
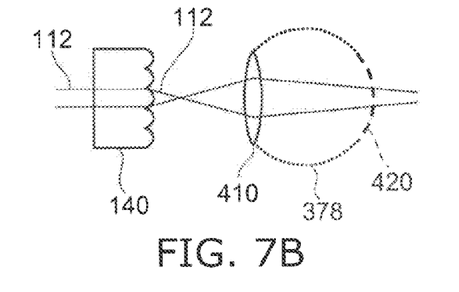
Figure 7C:
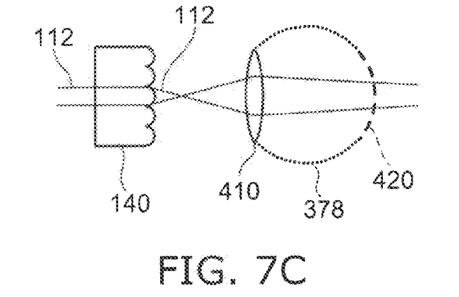

FIGS. 7A, 7B, and 7C illustrate the state of the viewer's eye in looking at a position nearer than the optical plate 140, at the optical plate 140, and at a position farther than the optical plate 140, respectively, in the case where the diameter φ of the light beam 112 is 1.0 mm, which is smaller than the microlens pitch, 1.5 mm. On the other hand, FIGS. 7D, 7E, and 7F illustrate the state of the viewer's eye in looking at a position nearer than the optical plate 140, at the optical plate 140, and at a position farther than the optical plate 140, respectively, in the case where the diameter φ of the light beam 112 is 4.5 mm, which is larger than the microlens pitch, 1.5 mm.

Figure 7D:
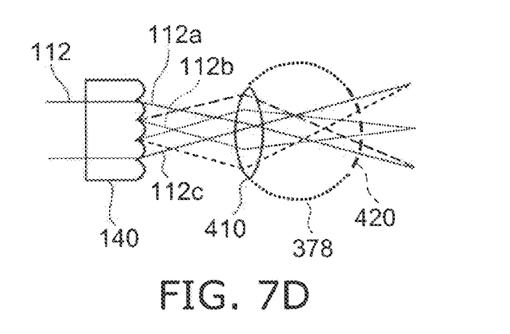

As shown in FIG. 7D, in the case where the diameter φ of the light beam 112 is 4.5 mm, which is larger than the microlens pitch, 1.5 mm (the diameter φ of the light beam 112 is three times the microlens pitch p), the light beam 112 incident on the optical plate 140 is split into three light beams 112a-112c. When the viewer looks at a position nearer than the optical plate 140 (focuses the eye 378 on a position nearer than the optical plate 140), the lens (crystalline lens) 410 of the viewer's eye 378 converges the light beams 112a-112c before the retina 420 of the eye 378. On the retina 420, the light beams 112a-112c are separated from each other and do not interfere with each other.

Figure 7E:
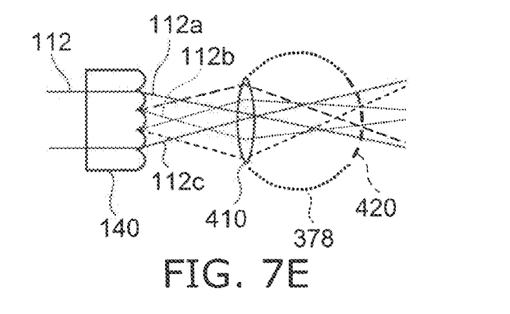

Furthermore, as shown in FIG. 7E, when the viewer looks at the optical plate 140 (focuses on the optical plate 140), the lens (crystalline lens) 410 converges the light beams 112a-112c on the retina 420 so that the light beams border on each other. Also in this case, the light beams 112a-112c do not interfere with each other.

Figure 7F:
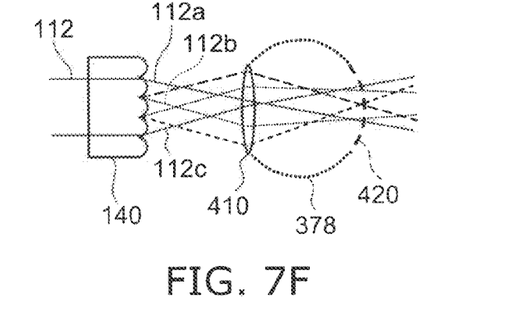

In contrast, as shown in FIG. 7F, when the viewer looks at a position farther than the optical plate 140 (focuses on a position farther than the optical plate 140), the lens (crystalline lens) 410 converges the light beams 112a-112c behind the retina 420. In this case, the light beams 112a-112c overlap each other on the retina 420, and hence interfere with each other, producing speckles.

On the other hand, as shown in FIGS. 7A to 7C, in the case where the diameter φ of the light beam 112 is smaller than the microlens pitch, 1.5 mm, the light incident on the optical plate 140 is not split, but remains a single light beam 112. Thus, no interference phenomenon occurs in the light beam 112 irrespective of whether the viewer looks at a position nearer or farther than the optical plate 140 or at the optical plate 140, and hence no speckle is produced.

Thus, speckles can be avoided by designing the diameter φ of the light beam 112 to be smaller than the microlens pitch p.

Furthermore, a description is given of the results of analyzing the relation of the microlens pitch p and the light beam diameter φ to the interference phenomenon.

FIG. 8 schematically illustrates the results of simulation analysis on the relation of the microlens pitch p and the light beam diameter φ to the interference phenomenon.

Figure 8A:
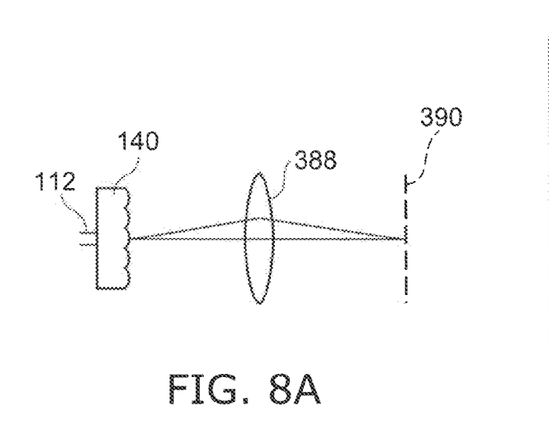
FIGS. 8A to 8D are schematic views illustrating the results of simulation analysis on the relation of the microlens pitch p and the light beam diameter $\phi$ to the interference phenomenon.

FIG. 8A is a schematic view illustrating the optical system used in this simulation.

As shown in FIG. 8A, an optical plate 140 and a convex lens 388 were placed, and the distance between the optical plate 140 and the convex lens 388 was 200 mm. The optical plate 140 was a lenticular plate in which microlenses (cylindrical lenses) are arranged in parallel. The pitch p of the microlens was 0.5 mm, and its curvature radius R was 13 mm. The focal distance of the convex lens 388 was set to 100 mm. In this optical system, a light beam 112 having a wavelength of 1 μm is incident on the optical plate 140, passes through the convex lens 388, and reaches the imaging position 390. The distance between the convex lens 388 and the imaging position 390 was 150 mm, which was 50 mm shorter than the imaging position of the convex lens, 200 mm. In this optical system, the diameter φ of the light beam 112 was varied for wave simulation.

Figure 8B:
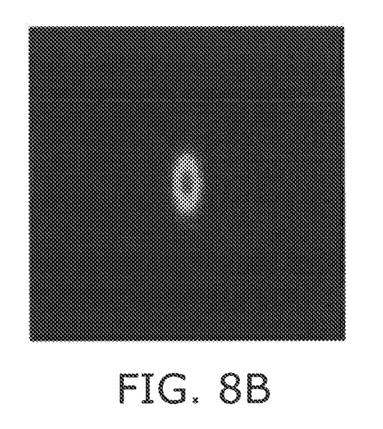
Figure 8C:
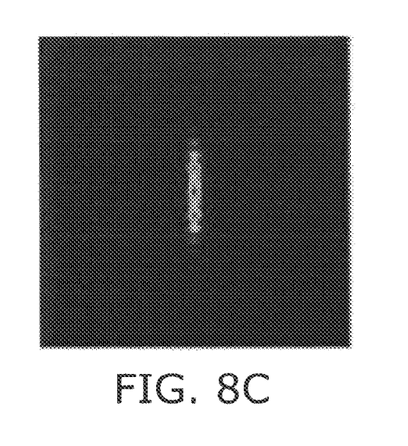
Figure 8D:
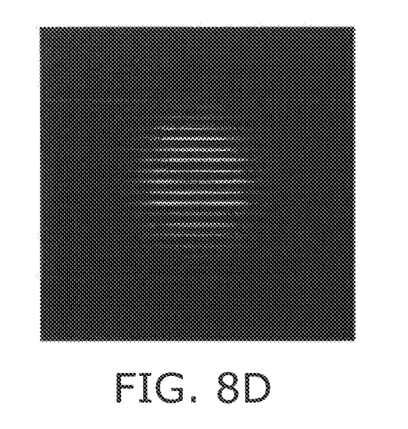

FIGS. 8B to 8D are schematic views showing the simulation results in the case where the diameter φ of the light beam 112 is 0.25 mm, 0.5 mm, and 3.0 mm, respectively.

As shown in FIG. 8D, when the diameter of the light beam 112 is 3.0 mm, which is larger than the pitch of the optical plate 140, 0.5 mm, a horizontal fringe pattern corresponding to the microlenses of the optical plate 140 is observed. This is because the light beam 112 is incident on the optical plate 140 over a plurality of microlenses (cylindrical lenses) to produce a plurality of light beams, which interfere with each other. In this case, speckles are produced.

On the other hand, as shown in FIG. 8B, when the diameter of the light beam 112 is 0.25 mm, which is smaller than the pitch of the optical plate 140, 0.5 mm, no fringe pattern is produced. This is because the light beam 112 fits into a single microlens, and hence causes no interference. Thus, no speckle is produced.

Furthermore, as shown in FIG. 8C, when the diameter of the light beam 112 is equal to the pitch of the optical plate 140, 0.5 mm, a fringe pattern is slightly produced. This is because, when the diameter φ of the light beam 112 is equal to the pitch of the optical plate 140, 0.5 mm, the light surrounding the light beam 112 does not fit into a single microlens, but protrudes therefrom. More specifically, the diameter φ of the light beam 112 is defined by the size at $1/e^2$ of the maximum intensity of the light beam 112. A slight light beam exists also outside the diameter φ of the light beam 112, and produces a slight fringe pattern of FIG. 8C. In this case, weak speckles are produced. However, this weak speckle is not very visibly conspicuous, and causes no practical problem.

Thus, there is no practical problem with speckles occurring when the diameter φ of the light beam 112 is equal to the microlens pitch of the optical plate 140, 0.5 mm, and speckles cause a problem when the diameter φ of the light beam 112 is larger than the microlens pitch of the optical plate 140, 0.5 mm. Hence, speckles can be substantially eliminated by designing the diameter φ of the light beam 112 to be smaller than the pitch of the optical plate 140.

As described above, in this disclosure, the diameter φ of the light beam is defined as the diameter at $1/e^2$ of the maximum intensity, that is, approximately 13.5% of the maximum intensity, assuming that the intensity of the light beam has a Gaussian distribution. Hence, the area outside the diameter φ of the light beam is also irradiated with laser light having an intensity lower than 13.5%. However, speckles produced thereby have low intensity, and hence it is often the case that they cause no practical problem. Thus, in the display device of the embodiment of the invention, speckles can be substantially eliminated if the diameter φ of the light beam as defined above is smaller than the microlens pitch.

As described above, in the display device of this embodiment, the diameter φ of the light beam 112 is designed to be smaller than the pitch p of the microlens 145 of the optical plate 140. Hence, a display free from speckles can be realized with high display uniformity and a controlled divergence angle. Thus, a bright display can be realized with a limited spatial region of visible display, and a highly visible HUD can be realized with a controlled spatial region of visible display (for example, controlled so that the display is visible to only one eye).

The optical plate 140 in this embodiment can be implemented variously. FIG. 9 shows schematic perspective views illustrating optical plates used in the display device according to the embodiment of the invention.

Figure 9A:
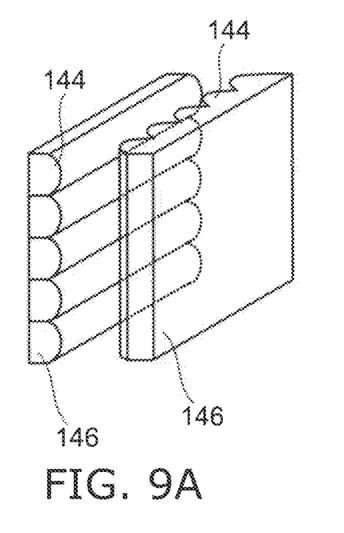
FIGS. 9A to 9D are schematic perspective views illustrating optical plates used in the display device according to the embodiment of the invention.
Figure 9B:
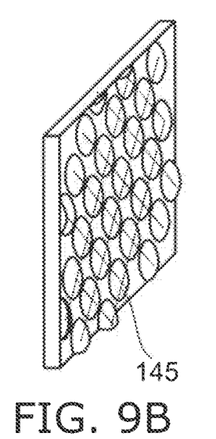
Figure 9C:
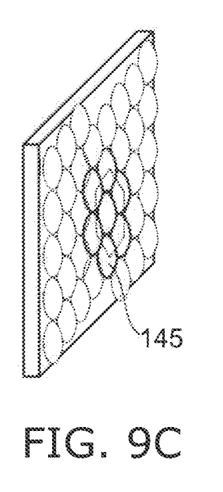
Figure 9D:
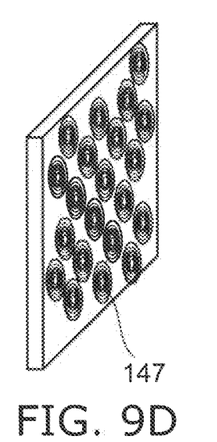

As shown in FIG. 9A, the optical plate 140 can be made of two lenticular plates 146 with a plurality of cylindrical lenses 144 arrayed therein, the lenticular plates 146 being placed so that the cylindrical lenses 144 have generally orthogonal extending directions and are opposed to each other. Alternatively, as shown in FIG. 9B, it is also possible to use a microlens array in which dome-shaped microlenses 145 are linearly arrayed on a flat plate. Furthermore, as shown in FIG. 9C, it is possible to use a microlens array in which dome-shaped microlenses 145 are arrayed on a flat plate in a hexagonal packing configuration. Moreover, as shown in FIG. 9D, it is also possible to use a microlens array in which graded-index microlenses 147 with a generally circular distribution of refractive index are placed on a flat plate. In these optical plates, the divergence angle of the light beam can be controlled by controlling the shape of the cylindrical lens 144 and the dome-shaped microlenses 145, the refractive index of the material thereof, and the refractive index distribution of the graded-index microlenses 147. Besides the foregoing, for example, the optical plate 140 can be based on any of various configurations, such as a prism sheet or various louvered sheets in which a plurality of peaks and grooves shaped like triangular prisms are arrayed in parallel, and a structure in which a plurality of waveguides shaped like truncated triangular pyramids are arrayed.

The light beam 112 can be incident on the optical plate 140 whether from the first major surface (flat surface) of the optical plate 140 or from the second major surface (the surface provided with microlenses). Furthermore, microlenses can be formed on both the major surfaces of the optical plate 140.

In the display device 10 of the first embodiment of the invention illustrated in FIG. 1, the first mirror (scanning section) 120 illustratively serves to scan the light beam 112. The light beam 112 can be scanned by varying the set angle using the driver (not shown) of the first mirror. Furthermore, although the first mirror 120 is shown in FIG. 1 as a flat mirror, it can be a concave mirror. Alternatively, it can be configured as a concave mirror combined with a convex mirror for correcting image distortion.

When the projection position of the light beam 112 is varied, the second mirror 150 can vary the projection position by varying the set angle using a second mirror driver, not shown. For example, it can be used to vary the projection position to follow the movement of the eye of the viewer 510. Here, the viewer's head can be imaged by a camera, not shown, and the imaged data can be subjected to image processing to recognize the viewer's head and eye. In accordance therewith, the projection position can be automatically controlled. However, the mechanism for automatically controlling the second mirror 150 by the driver and the imaging camera is not necessarily needed, but can be provided if necessary.

The operation of the driver for the first mirror and the driver for the second mirror can be controlled by a controller 108.

Second Embodiment

Next, a second embodiment is described.

Figure 10:
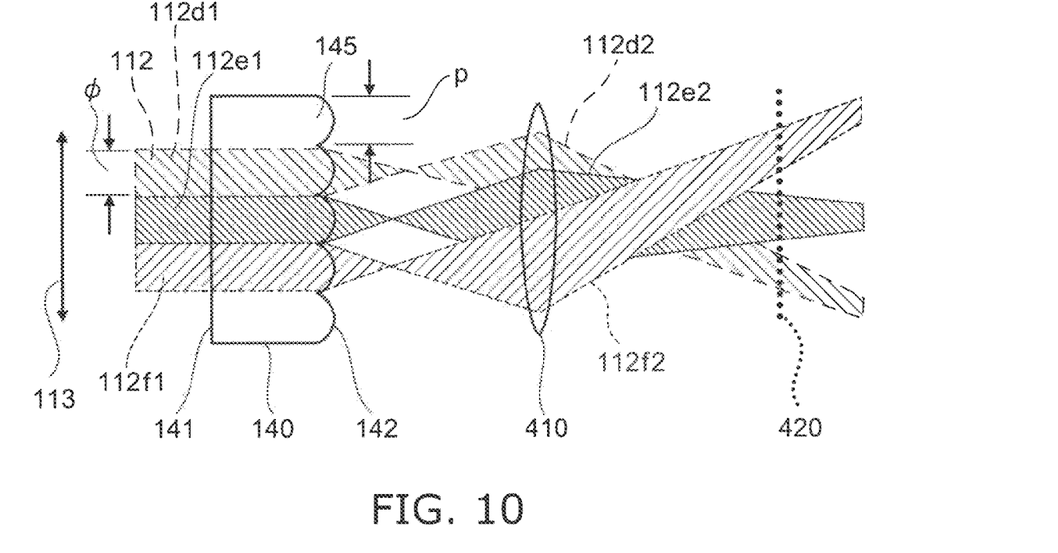
FIG. 10 is a schematic view illustrating the configuration of a display device according to a second embodiment of the invention.

FIG. 10 is a schematic view illustrating the configuration of a display device according to the second embodiment of the invention.

The display device according to the second embodiment is configured like the display device according to the first embodiment illustrated in FIG. 1 except that the light beam 112 is scanned. FIG. 10 schematically illustrates the relative positional relationship between the optical plate 140 and the light beam 112 in the second embodiment.

As shown in FIG. 10, the diameter φ of the light beam 112 is designed to be smaller than the pitch p of the microlens 145 of the optical plate 140. The light beam 112 is scanned in the scan direction 113. More specifically, at a given time, the light beam 112d1 passes through the optical plate 140 to produce a light beam 112d2. At a later time, the light beam 112e1 passes through the optical plate 140 to produce a light beam 112e2. Subsequently, the light beam 112f1 passes through the optical plate 140 to produce a light beam 112f2. These light beams 112d2, 112e2, 112f2 are temporally independent, and hence do not overlap each other. Thus, they do not interfere with each other, and no speckle is produced.

Here, in scanning the light beam 112, if the light beam 112 straddles the boundary of the microlens 145, the light beam 112 does not travel in the desired direction and causes interference. To avoid this, it is possible to substantially prevent the light beam 112 from irradiating the boundary of the microlens 145. This can be realized by generating the light beam 112 in a pulsed manner (intermittently) and synchronizing the pulse generation with the scan timing. This can be performed by the controller 108 for controlling the light source 110 and the first mirror 120 illustrated in FIG. 1.

Thus, in the display device of this embodiment, the diameter φ of the light beam 112 is designed to be smaller than the pitch p of the microlens 145 of the optical plate 140, and the light beam 112 is scanned so as to substantially avoid irradiating the boundary of the microlens 145. Hence, a display free from speckles can be realized with high display uniformity and a controlled divergence angle. Thus, a bright display can be realized with a limited spatial region of visible display, and a highly visible HUD can be realized with a controlled spatial region of visible display (for example, controlled so that the display is visible to only one eye).

Third Embodiment

Next, a display device of a third embodiment of the invention is described. In the display device of the third embodiment, a light shielding layer is provided in the boundary region of the microlens.

Figure 11:
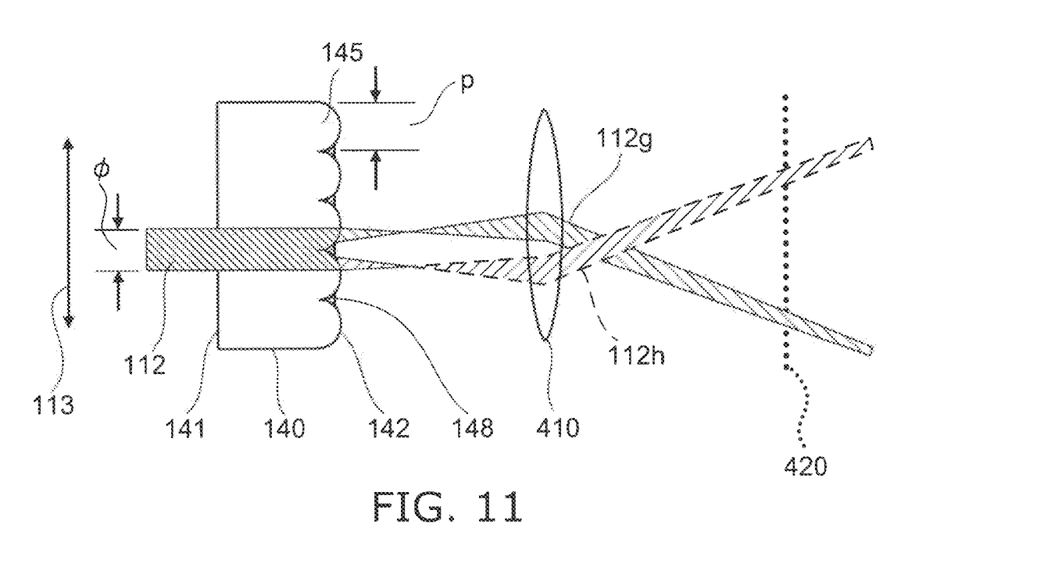
FIG. 11 is a schematic view illustrating the configuration of a display device according to a third embodiment of the invention.

FIG. 11 is a schematic view illustrating the configuration of a display device according to the third embodiment of the invention.

As shown in FIG. 11, the display device according to the third embodiment is configured like the display device of the first embodiment illustrated in FIG. 1 except that a light shielding layer 148 is provided in the boundary region of the microlens 145, and the remaining configuration is the same as that of the first embodiment. As described previously, in scanning the light beam 112, if the light beam 112 straddles the boundary of the microlens 145, the light beam 112 does not travel in the desired direction and causes interference. To avoid this, the light shielding layer 148 is provided in the boundary region of the microlens 145 to substantially prevent the light beam 112 from irradiating the boundary of the microlens 145. This serves to eliminate speckles that may otherwise occur when the light beam 112 is incident on or emitted from the boundary of the microlens 145. Thus, speckles can be substantially avoided even if the diameter φ of the light beam 112 is slightly larger than the microlens pitch p, or even if the control for scanning the light beam 112 is slightly misaligned with the position of the microlens 145. Hence, the design margin of various components in the display device 10 is expanded, and stable performance can be realized cost-effectively.

Thus, in the display device of this embodiment, the light shielding layer 148 is provided in the boundary region of the microlens 145 to substantially prevent the light beam 112 from irradiating the boundary of the microlens 145. Hence, a display free from speckles can be realized with high display uniformity and a controlled divergence angle. Thus, a bright display can be realized with a limited spatial region of visible display, and a highly visible HUD can be realized with a controlled spatial region of visible display (for example, controlled so that the display is visible to only one eye).

The light shielding layer 148 can be illustratively made of a light shielding resin in which carbon, various inorganic pigments, or various organic pigments are mixed with a resin. By known photolithography methods, a light shielding layer 148 having a prescribed shape can be formed at the boundary of the microlens 145. Here, if the resin is made of a photosensitive resin such as a photosensitive acrylic resin, the number of process steps can be advantageously reduced. Furthermore, the light shielding layer 148 can be provided by the ink jet method and the like.

The shape and size of the light shielding layer 148 are suitably designed in accordance with the relative relationship between the diameter φ of the light beam 112 and the microlens 145 so that the light beam 112 incident on the boundary of the microlens 145 can be substantially shielded. FIG. 11 shows an example in which the light shielding layer 148 is provided on the second major surface 142 of the optical plate 140 provided with the microlens 145. Alternatively, the light shielding layer 148 can be provided in a region corresponding to the boundary of the microlens 145 on the other side, that is, the first major surface 141.

Fourth Embodiment

Next, a display device of a fourth embodiment of the invention is described. In the display device of the fourth embodiment, three color light sources are used to realize a color display.

Figure 12:
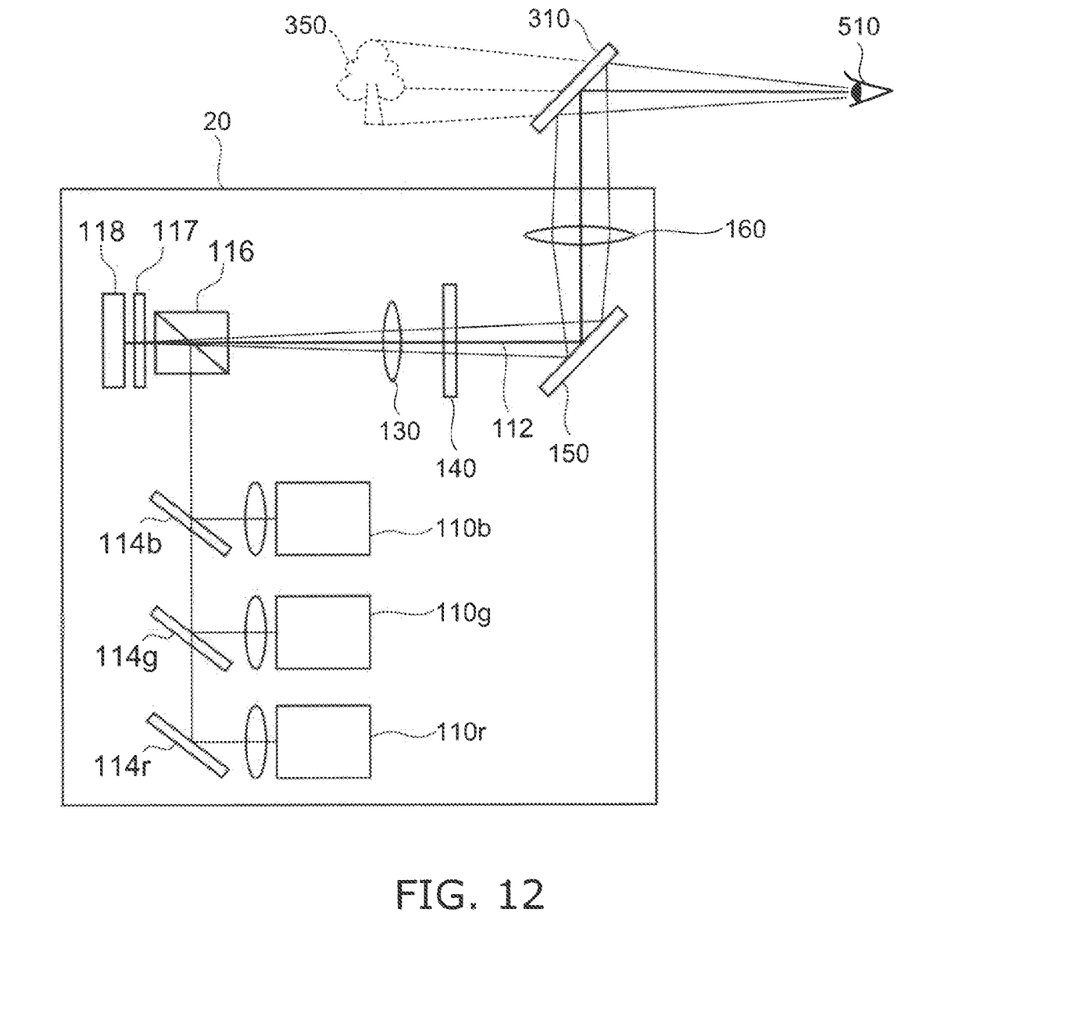
FIG. 12 is a schematic view illustrating the configuration of a display device according to a fourth embodiment of the invention.

FIG. 12 is a schematic view illustrating the configuration of a display device according to the fourth embodiment of the invention.

As shown in FIG. 12, the display device 20 according to the fourth embodiment is configured like the display device of the first embodiment illustrated in FIG. 1 except that the light source 110 is made of three color light sources, that is, a red LD 110r, a green LD 110g, and a blue LD 110b. The light generated by the red LD 110r, the green LD 110g, and the blue LD 110b passes through a red-reflecting mirror 114r, a green-reflecting mirror 114g, and a blue-reflecting mirror 114b, respectively, and through a polarization beam splitter 116 and a quarter-wave plate 117, and reaches a MEMS (microelectromechanical system) scanner 118. The light of each color is modulated with an image signal by the MEMS scanner 118 and emitted therefrom, passes through the quarter-wave plate 117 and the polarization beam splitter 116, and is incident on a projection lens 130. Then, the light passes through an optical system like that of the display device 10 shown in FIG. 1 and reaches the viewer 510. Thus, the viewer 510 can obtain a color display.

In the display device 20 of this embodiment, the diameter φ of the three-color light beam 112 is designed to be smaller than the pitch p of the microlens 145 of the optical plate 140. Furthermore, the light beam 112 generated in a pulsed manner is scanned so as to substantially avoid irradiating the boundary of the microlens 145. Hence, a color display free from speckles can be realized with high display uniformity and a controlled divergence angle. Thus, a bright color display can be realized with a limited spatial region of visible display, and a highly visible color HUD can be realized with a controlled spatial region of visible display (for example, controlled so that the display is visible to only one eye).

In this embodiment, a light shielding layer 148 can be provided on the optical plate 140 so that the light beam 112 can substantially avoid irradiating the boundary of the microlens 145. Alternatively, a light shielding layer 148 can be provided at the boundary of the microlens 145 of the optical plate 140, and a continuously generated light beam 112 can be used.

With regard to the light source, FIG. 12 illustrates three color light sources. However, it is also possible to use two colors, or four or more colors.

In this embodiment, the MEMS scanner 118 serves as a scanning section.

Fifth Embodiment

Next, a display device of a fifth embodiment of the invention is described. The display device of the fifth embodiment is an example of the rear projection display device.

Figure 13:
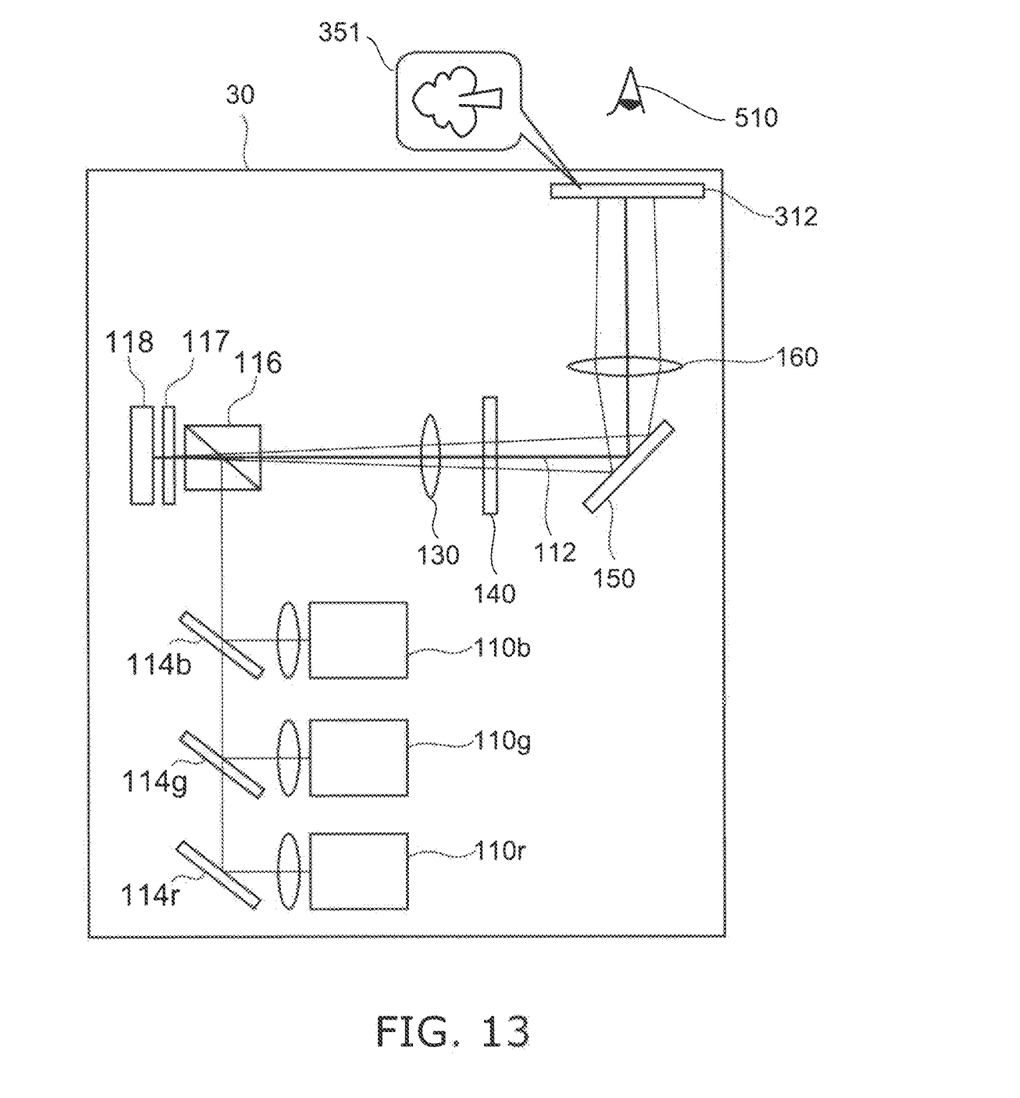
FIG. 13 is a schematic view illustrating the configuration of a display device according to a fifth embodiment of the invention.

FIG. 13 is a schematic view illustrating the configuration of a display device according to the fifth embodiment of the invention.

As shown in FIG. 13, the display device 30 according to the fifth embodiment includes a projection plate 312 in addition to the display device 20 illustrated in FIG. 12. The projection plate 312 is illustratively made of a diffusive optical sheet and forms an image 351 in response to the light beam 112 incident on its rear surface. The image 351 is visible to the viewer 510. That is, the display device 30 of this embodiment is a rear projection display device including a projection plate 312. In the display device 30 of this embodiment, the diameter φ of the light beam 112 is designed to be smaller than the pitch p of the microlens 145. Hence, even if a laser light source with low power and high brightness is used, a display free from speckles can be realized with high display uniformity. In the example shown in FIG. 13, three color LDs are used as light sources. However, this embodiment is not limited thereto, but it is also possible to use one light source, two color light sources, or four or more color light sources. Furthermore, the light beam 112 can be generated in a pulsed manner and scanned in synchronization with the pulse so as to avoid irradiating the boundary of the microlens 145. Moreover, a light shielding layer can be provided at the boundary of the microlens 145.

Sixth Embodiment

In FIGS. 1 and 12, the projection plate 310 can illustratively be a car windshield. Thus, simultaneously the background field outside the car windshield, various traffic information can be displayed and viewed through the windshield.

Figure 14:
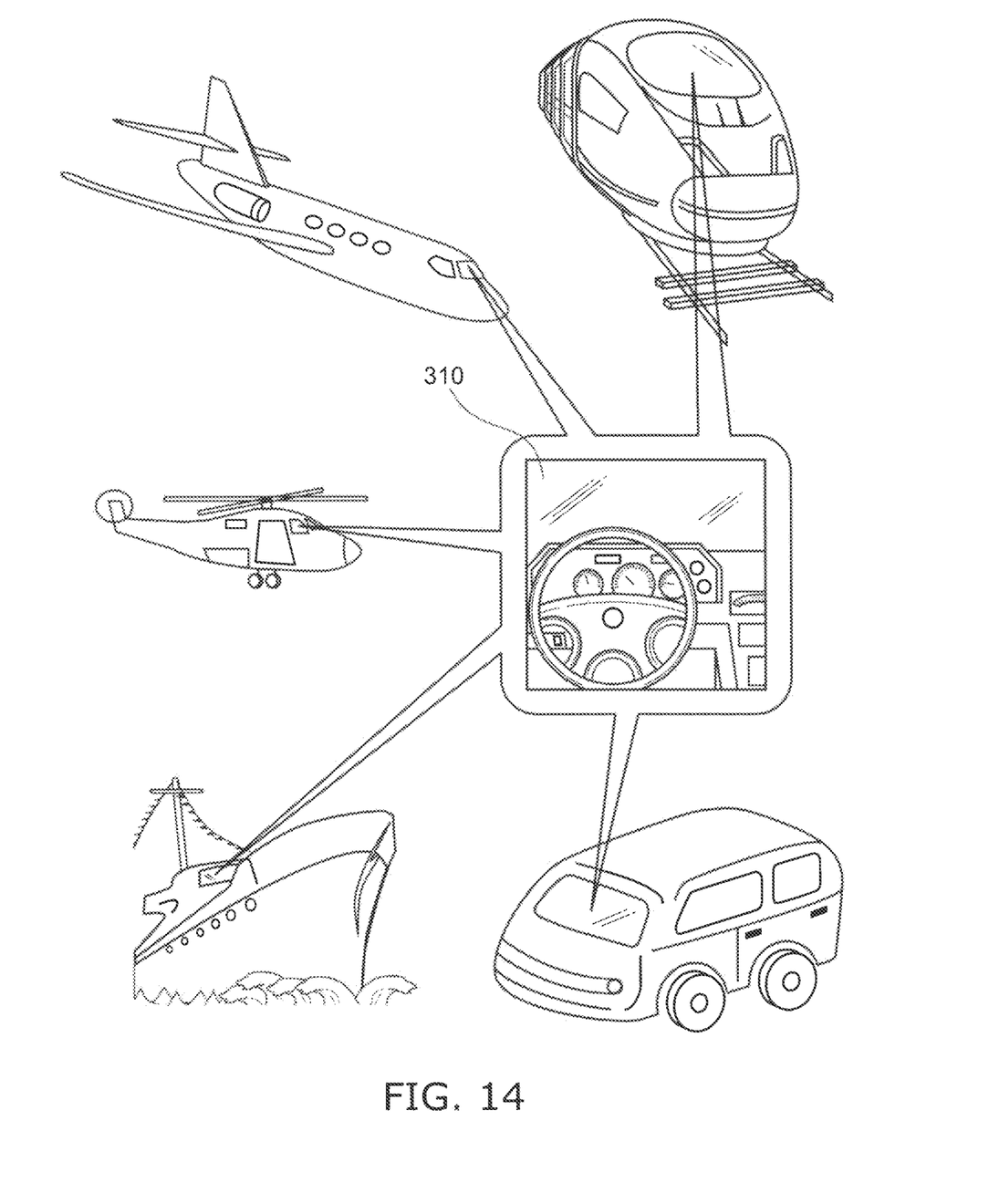
FIG. 14 is a schematic view illustrating a vehicle based on the display device of the embodiments of the invention.

FIG. 14 is a schematic view illustrating a vehicle based on the display device of the embodiments of the invention.

As shown in FIG. 14, the window, for example, in various vehicles of the sixth embodiment of the invention, such as a car, train, ship, helicopter, and aircraft, is provided with a projection plate 310 capable of forming a virtual image by projection of a light beam 112. A light beam is projected on this projection plate by the display device of the embodiments of the invention to form a virtual image on the projection plate 310. Thus, a display free from speckles can be produced with high display uniformity and a controlled divergence angle. This enables safe and efficient travel of the vehicle. The projection plate 310 can be formed from a glass or resin plate of various types shaped like a flat or curved plate, which illustratively serves as a window of the vehicle, and can be designed to have suitable reflection and transmission performance.

In this disclosure, it is assumed that the terms "parallel" and "orthogonal" include displacement from the exact parallelism and orthogonality due to variation in the manufacturing process and the like.

The embodiments of the invention have been described with reference to examples. However, the invention is not limited to these examples. For instance, any specific configurations of the components constituting the display device and the vehicle based thereon are encompassed within the scope of the invention as long as those skilled in the art can similarly practice the invention and achieve similar effects by suitably selecting such configurations from conventionally known ones.

Furthermore, any two or more components of the examples can be combined with each other as long as technically feasible, and such combinations are also encompassed within the scope of the invention as long as they fall within the spirit of the invention.

Furthermore, those skilled in the art can suitably modify and implement the display device and the vehicle based thereon described above in the embodiments of the invention, and any display devices and vehicles based thereon thus modified are also encompassed within the scope of the invention as long as they fall within the spirit of the invention.

Furthermore, those skilled in the art can conceive various modifications and variations within the spirit of the invention, and it is understood that such modifications and variations are also encompassed within the scope of the invention.

The invention claimed is:

1. A display device comprising:
    a light source configured to generate a light beam being coherent and having a diameter that incorporates all of the light from the light source;
    an optical plate including a plurality of microlenses arranged with a period larger than the diameter of the light beam, the optical plate being configured to control a divergence angle of the light beam;
    a scanning section configured to scan the light beam in a surface of the optical plate; and
    a controller connected to synchronize the light source with the scanning section,
    the plurality of microlenses including a first microlens and a second microlens adjacent to the first microlens, the light beam being configured to pass the first microlens and not to pass the second microlens in a first period of time, the light beam being configured to pass the second microlens and not to pass the first microlens in a second period of time, and the light source being configured not to generate the light beam in a period of time between the first period of time and the second period of time.

2. The display device according to claim 1, wherein the light source
includes at least one of a solid-state laser, a gas laser, a semiconductor laser, and a laser diode.

3. The display device according to claim 1, wherein the light source generates light beams having mutually different peak wavelengths.

4. The display device according to claim 1, wherein the light source generates light beams having red color, green color, and blue color.

5. The display device according to claim 1, wherein the period is larger than the diameter of the light beam at approximately 13.5% of the maximum intensity of the light beam.

6. The display device according to claim 1, wherein the microlenses are regularly arranged in a two-dimensional manner.

7. The display device according to claim 1, wherein the optical plate includes two lenticular plates in which microlenses have mutually orthogonal extending directions and are opposed to each other.

8. The display device according to claim 1, wherein the optical plate includes at least one of dome-shaped microlenses linearly provided on a flat plate, dome-shaped microlenses arrayed on a flat plate in a hexagonal packing configuration, graded-index microlenses with a generally circular distribution of refractive index arrayed on a flat plate, a prism sheet or a louvered sheet in which a plurality of peaks and grooves shaped like triangular prisms are arrayed in parallel on a flat plate, and a waveguide shaped like a truncated triangular pyramid.

9. The display device according to claim 1, wherein the microlenses is provided on at least one of a first major surface of the optical plate and a second major surface thereof on the opposite side of the first major surface.

10. The display device according to claim 1, wherein the scanning section includes a flat or concave reflecting surface.

11. The display device according to claim 1, wherein the scanning section scans the light beam in synchronization with the generation of the light beam.

12. The display device according to claim 1, wherein the optical plate further includes a light shielding layer provided at a boundary of the microlenses.

13. The display device according to claim 12, wherein the light shielding layer is made of a light shielding resin containing at least one of carbon, an inorganic pigment, and an organic pigment.

14. The display device according to claim 12, wherein the light shielding layer is made of a photosensitive resin containing at least one of carbon, an inorganic pigment, and an organic pigment.

15. The display device according to claim 12, wherein the light shielding layer is made of a light shielding resin containing at least one of carbon, an inorganic pigment, and an organic pigment provided by an ink jet method.

16. The display device according to claim 1, further comprising: a projection direction controller configured to vary a projection direction of the light beam.

17. The display device according to claim 1, wherein the light beam is incident on only one eye of a viewer.

18. A vehicle comprising:
a display device including a light source configured to generate a light beam being coherent and having a diameter that incorporates all of the light from the light source;
an optical plate including a plurality of microlenses arranged with a period larger than the diameter of the light beam, the optical plate being configured to control a divergence angle of the light beam;
a scanning section configured to scan the light beam in a surface of the optical plate;
a controller connected to synchronize the light source with the scanning section; and
a projection plate on which the light beam emitted from the display device is projected,
the plurality of microlenses including a first microlens and a second microlens adjacent to the first microlens,
the light beam being configured to pass the first microlens and not to pass the second microlens in a first period of time,
the light beam being configured to pass the second microlens and not to pass the first microlens in a second period of time, and
the light source being configured not to generate the light beam in a period of time between the first period of time and the second period of time.

19. The display device according to claim 12, wherein a size of the light shielding layer is larger than the diameter of the light beam.

* * * * *